Sept. 20, 1960 F. W. AINSWORTH 2,953,163
SELF-CLEARING VALVE
Filed April 8, 1955
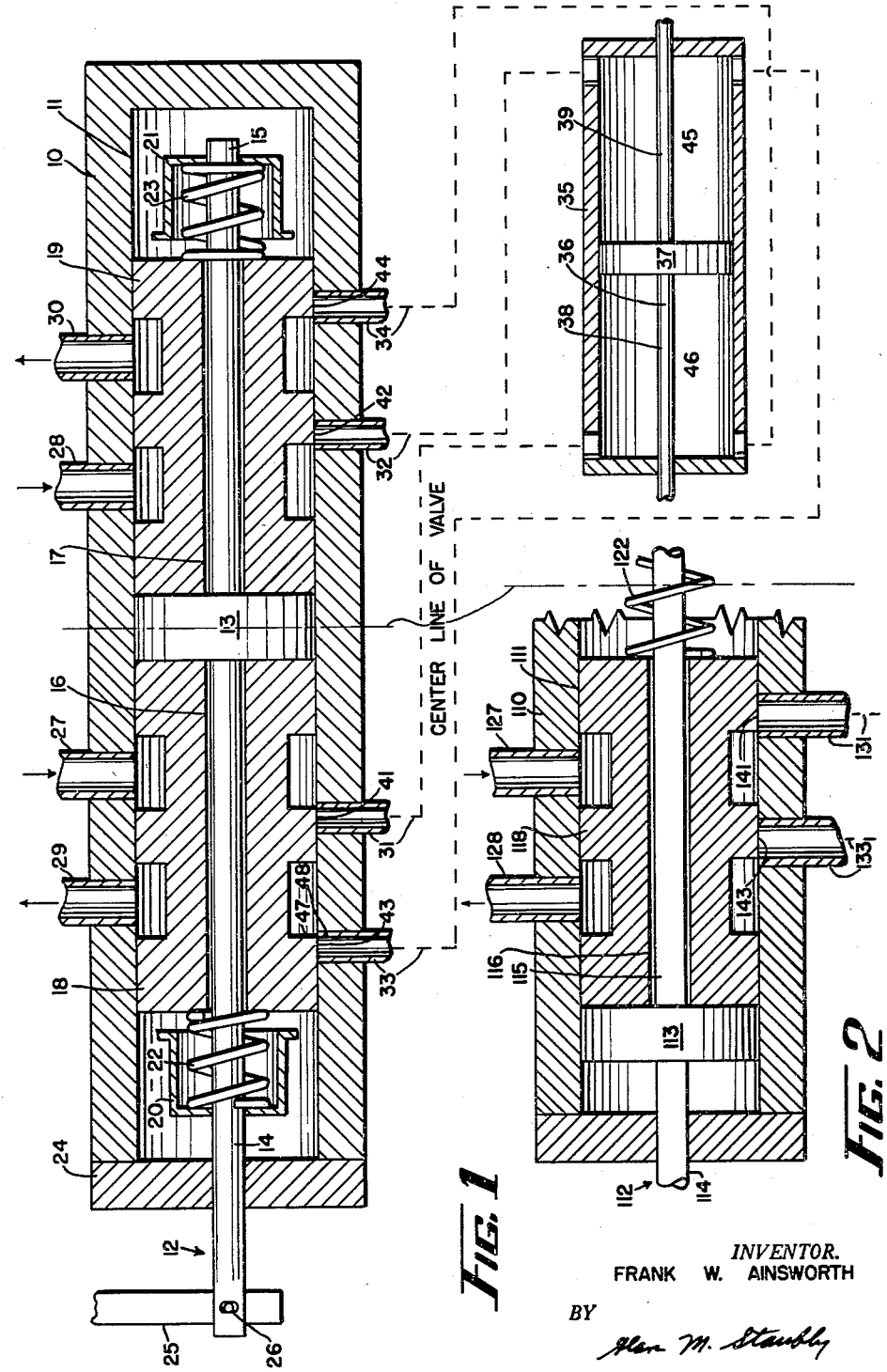
FIG. 2
INVENTOR.
FRANK W. AINSWORTH
BY
Glen M. Staubly
ATTORNEY

United States Patent Office 2,953,163

Patented Sept. 20, 1960

2,953,163
SELF-CLEARING VALVE

Frank W. Ainsworth, Minneapolis, Minn., assignor to Minneapolis-Honeywell Regulator Company, Minneapolis, Minn., a corporation of Delaware Filed Apr. 8, 1955, Ser. No. 500,079

8 Claims. (Cl. 137—622)

This invention relates to the control of valves and like devices, and more specifically is directed to the attainment of increased reliability of operation of such devices by the reduction of the possibility of "jamming" therein.

In recent years the demand for "high performance" valves, that is, those that have fast and accurate response, has increased at a very rapid rate as has the demand for valves with higher and higher performance. Especially is this true in the development of aircraft hydraulic systems. Not only has the demand for high performance valves increased, but the demand for smaller components has likewise increased due to savings in weight and space realized thereby. Thus, where once it was possible to produce valves and the like that were reliable with regard to "jamming," due to foreign objects binding the valve components, unbalanced forces set up within the valve, etc., by merely increasing the size and capacity of the valve actuator, it is now required to do the specified job with components very limited in size. With such a situation the need has arisen for devices and designs to increase valve reliability and maintain high performance without sacrificing weight and space. There are devices in the prior art that have increased reliability of such valves, but such devices do not alleviate the reduction of high performance characteristics brought about by the cause of unreliability, as these devices require a relatively substantial time interval after the introduction of an error caused by jamming to correct the condition, and hence rapid and accurate response is sacrificed.

It is an object of this invention to provide a valve that has high reliability.

Another object of this invention is to provide a valve that can be positioned by an actuator that does not need extra capacity and size to physically overcome obstructions standing in the way or tending to bind the valve.

It is another object of this invention to provide a valve with reliability, which will also allow maximum utilization of its high performance characteristics.

A further object of this invention is to provide a valve that is "self-washing" with regard to obstructions between the valve members located at the porting edges.

These and other objects will become apparent upon a reading of the following specification and appended claims in connection with the accompanying drawing in which:

Figure 1 is a cross-sectional view of a valve containing the invention; and

Figure 2 is a partial cross-section view of another form of the invention.

The present invention eliminates the problem of jamming by bypassing it. This is done by providing a device that compensates for the error of the control device caused by valve jamming as soon as it arises, and by further providing means for "washing-away" the obstruction causing such jamming when an opposite movement of the control device is required. This is accomplished by providing a valve with two valving elements independent of each other, each controlling movement of the control device in one direction, and actuated by an actuator free to move in at least one direction regardless of the condition of one of the valving members. The usual occurrance of jamming is at the port of the valve as it is being closed. If, therefore, this device should have one of its valving members jammed open, the other valve member will be free to move to correct the error brought about by this condition. Upon a demand for the former valving member to again open, the obstructions will be washed away. Thus, the reliability is increased and high performance is maintained.

In Figure 1, valve body 10 has within its bore 11 an actuator 12 comprised of a piston 13 and a pair of stems 14 and 15 extending in either direction therefrom and passing through bores 16 and 17 of valve spools 18 and 19, respectively. Cup members 20 and 21 are firmly and suitably attached to stems 14 and 15 near their outward extremities. Disposed about the valve stems 14 and 15, and disposed between the cup members 20 and 21 and valve spools 18 and 19, respectively, are springs 22 and 23 which bias the valve spools 18 and 19 toward the actuator piston 13. Cap 24 is secured by any suitable means (not shown) to the valve body 10. Armature 25 of a torque motor or other actuating device, not shown, is suitably connected to stem 14 at 26.

Inlet pressure pipes 27 and 28 connect with a pressure source, not shown, and are connected to valve body 10. Outlet pressure pipes 29 and 30 are connected to valve body 10 and are connected with a sump, not shown. Supply conduits 31 and 32 and exhaust conduits 33 and 34 lead from the valve body 10, to which they are connected, to the cylinder 35, to which they are also connected. Within the cylinder 35 is an actuator 36 having a piston 37 and stems 38 and 39 connected to a controlled member, not shown.

Having given a description of the device, a description of the operation will now be given. Assume that the valve is in the position shown and a movement of the actuator 36 to the right is desired, and assume further that valve spools 18 and 19 are free to move and are not in a jammed condition. Under these assumptions, the actuator 12 would be moved to the left under the influence of armature 25 of a torque motor or other actuating device, not shown, thus placing a positive force on valve spool 18 causing it to move to the left. This movement of the valve spool 18, causes the supply port 41 to be opened and places the inlet pressure fluid from the inlet pressure pipe 27 in communication with conduit 31 and chamber 46 of cylinder 35. The inrush of fluid to chamber 46 through conduit 31 forces actuator 36 to the right thereby forcing fluid from chamber 45 through conduit 33 and port 43 to the outlet pressure pipe 29 and thence to the sump, not shown. The movement to the left of the actuator 12 tends to cause an increased bias to be placed on valve spool 19 by the spring 23 being compressed under the action of the movement of the actuator 12 and the cup 21 and the relative inertia and friction of valve spool 19. As the spring bias overcomes the inertia and friction, the valve spool 19 also is moved to the left overclosing the supply port 42 and the exhaust port 44. When the condition required has been satisfied, the actuator 12 is moved to the right by the torque motor armature 25 positively repositioning valve spool 19 and such actuator movement places an increased bias on valve spool 18 to cause it movement to reclose ports 41 and 43 thereby shutting off fluid flow to and from chambers 46 and 45, respectively, of cylinder 35.

Now assume that the valve is opened, as was described above, and ports 41 and 43 are porting fluid to and from cylinder 35, respectively, and a demand for a closed position is transmitted to the armature 25. Valve spool 19 is then moved to the right by the actuator 12 and valve spool 18 is moved in the same direction by the action of the bias placed thereon by spring 22. Further assume that the valve ports 41 and 43 cannot be closed by the valve spool 18 by spring bias placed thereon, due to an obstruction, such as a chip, being lodged in one of the ports, for example between surface 47 of valve spool 18 and surface 48 of exhaust conduit 33, thereby obstructing movement of valve spool 18. Actuator 12 will continue to move to the right under the action of armature 25. With the valve spool 18 in an open position, due to the obstruction, fluid will continue to flow into chamber 46 forcing actuator 36 further to the right which creates an error in the position of actuator 36. This error is received by the servo system, or whatever control system the valve is under, and the system then sends a demand for opposite movement of the actuator 12 to the torque motor or other actuating device, not shown, to force the actuator 12 to the right, and therewith valve spool 19, to open ports 42 and 44 allowing pressure fluid flow to chamber 45 and exhaust flow from chamber 46 by means of supply conduit 32 and exhaust conduit 34 respectively. As the error is decreased, the valve spool 19 is repositioned to a more closed position until an equilibrium is reached whereby the leak of fluid to and from ports 41 and 43, respectively, is equal to the flow to and from ports 42 and 44, respectively. Then, as a further signal requires movement of the actuator 36 to the right, the actuator 12 moves to the left thereby moving valve spool 18 to the left thus allowing the chip causing the binding or jamming between valve body 10 and valve spool 18 to be washed away.

Thus, it can be seen that the actuator 36 can be controlled at all times regardless if one spool is stuck open by an obstruction. Further, it is apparent that the valve is self-washing and no provisions are required for overcoming the ordinary obstruction by using brute force. However, should the obstruction causing the error be so large as to cause excessive neutral leakage so that the pressure source potential needed to supply other circuits and components is seriously reduced, a force overpower device is provided. Thus, if the actuator 12 moves over to the right, when valve spool 18 is jammed open, to such a degree that spring 22 is compressed to such an extent that cup 20 is allowed to strike valve spool 18, force overpower will ensue and valve spool 18 will forcibly be freed and the obstruction sheared or crushed thereby.

Should the obstruction be lodged in ports 42 or 44 upon a closing movement of valve spool 19 to the left, the same general procedure would be followed to correct the error and clear the valve.

In Figure 2 a partial cross section of another embodiment is shown, wherein the portion shown corresponds to the left portion of the valve of Figure 1.

Valve body 110 has within its bore 111 an actuator 112 with a piston 113 at either end of a stem 115 which passes through the bore 116 of the valve spool 118. A spring 122 is placed about stem 115 and biases the valve spool 118 to the actuator piston 113, and also biases another valve, not shown, to the piston placed on the other end of stem 115. Stem 114 is connected to an actuating member such as a torque motor or other actuating device, not shown. Inlet fluid pressure, from a source not shown, enters inlet pipe 127 which is fluidly connected to valve body 110. Drain fluid passes through outlet pipe 128 which is connected to valve body 110 and thence to a sump, not shown. Fluid conduits 131 and 133 likewise are connected to valve body 110 and provide for passage of supply and exhaust fluid, respectively, to and from a controlled member, now shown.

The operation of this embodiment is similar to that described in conjunction with Figure 1, except motion of the actuator 112 to the right causes a positive force to be placed on valve spool 118 and a spring force on the other spool (not shown). Thus, this embodiment functions exactly the same as that shown in Figure 1 except that, for a rightward movement of 112 and 122 the left-hand spool controls flow in Figure 2 whereas the right-hand spool controls the flow in Figure 1. Similarly, the right-hand spool, not shown, in Figure 2 would overclose whereas, in Figure 1 it is the left-hand spool that overcloses. In operation, therefore, for any similar movements of 12 and 112, the positively moved spools and the spring biased spools of Figures 1 and 2 function exactly the same. The operation described for Figure 1 equally well describes the modification of Figure 2 by merely comparing like operated spools.

There are other possible modifications of the invention which are not shown. Therefore, the scope of the invention should be determined from the following claims.

I claim:

1. A nonjamming valve comprising a valve body having a pair of valve spools therein, said valve spools being separated from each other by an actuator having a pair of stems extending in either direction and passing freely through said valve spools, and springs operably attached to said actuator stems and biasing said spools toward said actuator, said valve body having two groups of ports, each group comprising an inlet port and an outlet port and also a supply port and an exhaust port leading to a controlled member, said ports being situated to coact with each of said valve spools so that movement of said actuator in either direction causes relative movement of said controlled member and so that movement of said actuator in either direction is independent of the condition of the spool from which the actuator is tending to move.

2. In valve control apparatus, the combination comprising a valve body having an actuator, a pair of valve spools, and a spring therein, said actuator having two end portions connected by a stem, said valve spools being straddled by said end portions and containing bores through which said stem can pass freely, said spring being disposed between and biasing each of said valve spools toward the respective end portions of said actuator, said valve body having two groups of ports, each group comprising an inlet port and an outlet port and also a supply port and an exhaust port leading to a controlled member, said ports situated to coact with each of said valve spools so that movement of said actuator in either direction causes relative movement of said controlled member and so that movement of said actuator in either direction is independent of the condition of the spool then under the influence of the bias of said spring only.

3. A valve comprising a valve member, two movable valving members therein, an actuator disposed between said valving members, and resilient means biasing said valving members towards said actuator, said valve having a double porting arrangement connected to a controlled device so that positive displacement of either of said valving members by movement of said actuator independent of the condition of the other of said valving members causes operation of said device, said resilient means tending to cause movement of the other of said valving members upon movement of said actuator.

4. In combination, a first valve member having therein a second valve member comprised of two separate portions removed from each other, actuator means for said portions, and resilient means biasing said portions against said actuator means, said valve members having a double porting arrangement which controls the operation of a controlled device by the positive displacement of either of said second valve portions by said actuator means independent of the condition of the other of said second valve portions.

5. A valve arrangement comprising a first valve member coacting with a second valve member, said second valve member being comprised of two separate portions spaced from each other, actuator means for said portions, and spring means biasing said second valve member portions toward said actuator means, said valve having a dual four-way valve porting arrangement such that movement of the actuator means in either direction causes positive displacement of one of said second valve member portions which displacement is independent of the condition of the other of said second valve member portions, said spring means tending to cause movement of the other of said second valve member portions upon movement of said actuator means.

6. A valve having two valving members therein, means for directly actuating either of said valving members, and resilient means for biasing said valving members against said actuating means, said valving members being so situated that movement of said actuating means causes positive movement of at least one of said valving members, the other of said valving members tending to be moved by the increased bias placed thereon by said resilient means due to movement of said actuating means, a reverse movement of said actuating means causing a positive movement of said other valving member.

7. A dual valve having two valving members therein, means for directly actuating either of said valving members, resilient means for biasing said valving members against said actuating means, said valving members being so situated that movement of said actuating means causes movement of at least one of said valving members, the other of said valving members tending to be moved by the increased bias placed thereon by said resilient means due to movement of said actuating means, and overpower means associated with said resilient means and said actuating means such that upon a predetermined movement of said actuating means without consequent movement of the valving member under the effect of the increased bias of said resilient means said overpower means causes a direct connection to be made between said actuating means and said valving member.

8. A dual valve arrangement wherein a movable valving element consists of two portions both biased to an actuator by strain release means in such a manner that movement of the actuator in either direction causes displacement of one of said portions and tends to cause displacement of the other of said portions due to the increased bias placed thereon by said strain release means resulting from the movement of said actuator, and means associated with said actuator and said strain release means for positively engaging the portion under the increased bias of said strain release means upon a predetermined amount of movemen of said actuator without consequent movement of said portion.

References Cited in the file of this patent
UNITED STATES PATENTS

| | | |
|---|---|---|
| 458,191 | Ripley | Aug. 25, 1891 |
| 1,063,632 | White | June 3, 1913 |
| 1,643,753 | Slattery | Sept. 27, 1927 |
| 2,654,392 | Allen | Oct. 6, 1953 |
| 2,729,242 | Olson | Jan. 3, 1956 |
| 2,733,732 | Baker | Feb. 7, 1956 |
| 2,774,376 | Young | Dec. 18, 1956 |
| 2,804,883 | Curlett | Sept. 3, 1957 |

FOREIGN PATENTS

| | | |
|---|---|---|
| 986,906 | France | Aug. 7, 1951 |